United States Patent [19]

Students

[11] 4,287,719
[45] Sep. 8, 1981

[54] CARBON DIOXIDE SNOW HOOD WITH J-HORN

[75] Inventor: Peter A. Students, West Chester, Ill.

[73] Assignee: Chemetron Corporation, Chicago, Ill.

[21] Appl. No.: 188,425

[22] Filed: Sep. 18, 1980

[51] Int. Cl.³ .................................................. F25J 1/00
[52] U.S. Cl. ........................................ 62/10; 62/35; 55/461
[58] Field of Search ..................... 62/10, 35; 55/461

[56] References Cited

U.S. PATENT DOCUMENTS

| | | | |
|---|---|---|---|
| 2,486,624 | 11/1949 | Williamson | 62/10 |
| 3,757,367 | 9/1973 | Campbell | 62/10 |
| 3,807,187 | 4/1974 | Vorel | 62/10 |
| 4,166,364 | 9/1979 | Ruprecht et al. | 62/35 |

FOREIGN PATENT DOCUMENTS 53-18478  6/1978  Japan ...................................... 62/10

*Primary Examiner*—Norman Yudkoff
*Attorney, Agent, or Firm*—John K. Williamson

[57] ABSTRACT

A compact, high-efficiency, J-tube carbon dioxide snow hood has a novel diffuser at the discharge end of the J-tube for providing a well-confined, concentrated snow deposit at a reduced exit velocity. The diffuser includes a pair of juxtaposed, axially upright cylindrical baffles which intercept the fine-particle snow discharge from the J-tube in a manner to create counterswirling currents of carbon dioxide snow. An upright cylindrical tube circumscribing the cylindrical baffles, and depending substantially beyond the lower ends of the baffles, forms a mixing chamber where the segregated counter-swirling currents of carbon dioxide snow interact to form desired larger-particle snow which is then passed from the chamber in a confined, low velocity, downwardly directly discharge. The vapor discharge from the J-tube is directed through an exhaust duct in the side wall of the snow hood such that carbon dioxide vapor in the discharge from the mixing chamber is removed by aspiration as is the vapor formed by sublimation of the snow beneath the hood.

11 Claims, 6 Drawing Figures

CARBON DIOXIDE SNOW HOOD WITH J-HORN

TECHNICAL FIELD

This invention relates to devices for generating carbon dioxide snow in general, and is particularly concerned with a compact, high-efficiency carbon dioxide snow hood of the type adapted to provide a concentrated, confined, low velocity flow of carbon dioxide snow for filling packing containers.

BACKGROUND ART

It has long been the practice to utilize carbon dioxide snow (dry ice) as a refrigerant for the shipment and temporary storage of poultry and meat products. Typically, a shipping box is partially filled with poultry or other perishable product and the remainder of the box is filled with carbon dioxide snow.

The basic process for generating carbon dioxide snow is relatively simple. When liquified carbon dioxide is directed through a restricted conduit to reduce the pressure from a point above the triple point pressure (approximately 75 psia) to a point below the triple point pressure, the liquified carbon dioxide is converted into a mixture of solid particles (snow) and vapor. In theory, when liquid carbon dioxide at 300 psig is flashed in the manner described, approximately 43% by weight of carbon dioxide snow is generated.

There are two basic devices employed for generating a pattern of carbon dioxide snow in devices which are adapted to fill shipping containers. The snow horn, as disclosed for example in U.S. Pat. No. 2,978,187, provides a well distributed, relatively low velocity discharge of $CO_2$ snow but also contains large amounts of $CO_2$ vapor in the discharge which must be vented from the packaging area. The J-tube, as disclosed for example in U.S. Pat. Nos. 3,757,367 and 4,111,671, separates most of the carbon dioxide vapor from the snow prior to discharge, but the J-tube discharge is at a relatively high velocity and the discharge is particularly difficult to confine because it is comprised of light, fine-particle snow. An advantage of the J-tube generator is that the separated carbon dioxide vapor flow can be utilized to exhaust the remaining vapor from the packing area by aspiration.

One machine for packing shipping containers with $CO_2$ snow is disclosed in U.S. Pat. No. 3,807,187, entited "Hood and Method for Generating Carbon Dioxide Snow". There, a snow horn and a J-tube are mounted within a vapor confining hood. The vapor flow from the J-tube is directed into an exhaust which serves to remove by aspiration the carbon dioxide vapor from the snow horn discharge as well as that generated by sublimation beneath the hood. While devices of this type have proved satisfactory, certain packing applications require a more compact and efficient device capable of providing a confined, low velocity discharge.

SUMMARY OF THE INVENTION

The snow hood of this invention is capable of generating a concentrated, well confined, low velocity discharge of carbon dioxide snow at high efficiencies. The compact size of the snow hood of this invention makes it particularly suited for mounting on overhead movable structures such that large packing containers can be filled without moving them to a fixed filling location.

The snow hood of this invention comprises a J-tube type generator provided with a diffuser assembly at its discharge end. The J-tube is disposed to provide a substantially horizontally projecting discharge with its vapor stream directed through an exhaust port in the surrounding hood for aspiration of carbon dioxide vapors beneath the snow hood.

The diffuser is adapted to receive only the snow stream from the discharge of the J-tube. The snow stream is directed against a pair of juxtaposed, upright cylindrical baffles to create opposed, counterswirling streamlets in the diffuser. An elongated tube circumscribing the cylindrical baffles forms a mixing chamber where the segregated countermoving streamlets from the baffles interact to form larger-particle snow which is then passed from the chamber in a confined, reduced velocity discharge for deposit in a shipping container or the like.

The J-tube and diffuser are covered by a cylindrical hood which is concentrically disposed with respect to the diffuser to create an annular space therebetween where carbon dioxide vapor in the discharge is exhausted by aspiration due to the action of the vapor discharge from the J-tube.

BEST MODE FOR CARRYING OUT THE INVENTION

Figure 1:
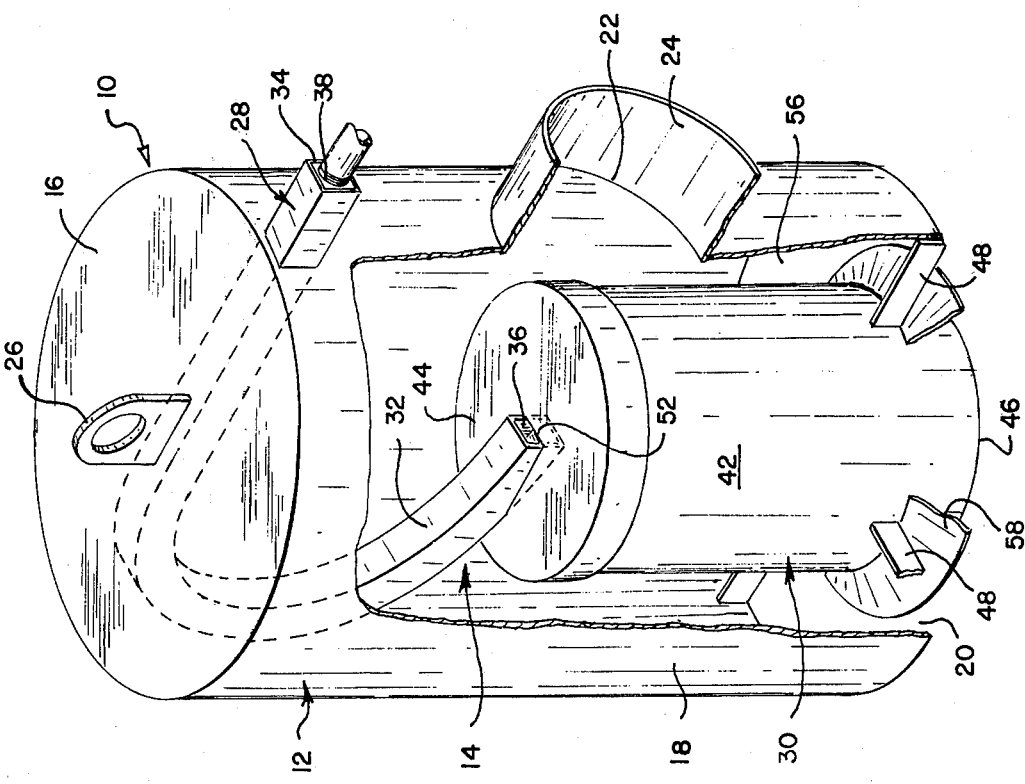
FIG. 1 is a perspective view of a carbon dioxide snow hood assembly constructed in accordance with the principles of the present invention, with a portions shown broken away to reveal details of construction.

In FIG. 1 there is shown a carbon dioxide snow hood assembly 10 comprising a normally upright, cylindrical hood 12 and a J-horn 14 supported within the hood 12 and adapted to generate a confined pattern of carbon dioxide snow as will be explained. It is to be understood that the J-horn 14 is in flow communication with a source of liquid carbon dioxide (not shown) when the assembly 10 is operated.

The hood 12 is generally elongated, having a top wall 16, a continuous side wall 18, and an open bottom 20. An exhaust port 22 extends through the side wall 18 intermediate the top wall 16 and bottom 20 to permit venting of carbon dioxide vapor from the interior of the hood 12, and further to this end an exhaust duct 24 projects radially from the side wall 18 in flow communication with the port 22 to provide a means for coupling the port 22 with a conventional venting system (not shown). The top wall 16 has a centrally disposed support lug 26 for convenient attachment to an overhead support structure such as a hoist or the like.

The J-horn 14 comprises a J-tube 28 for generating carbon dioxide snow, and a diffuser 30 adapted to receive a portion of the discharge from the J-tube 28 as will be described.

Figure 3:
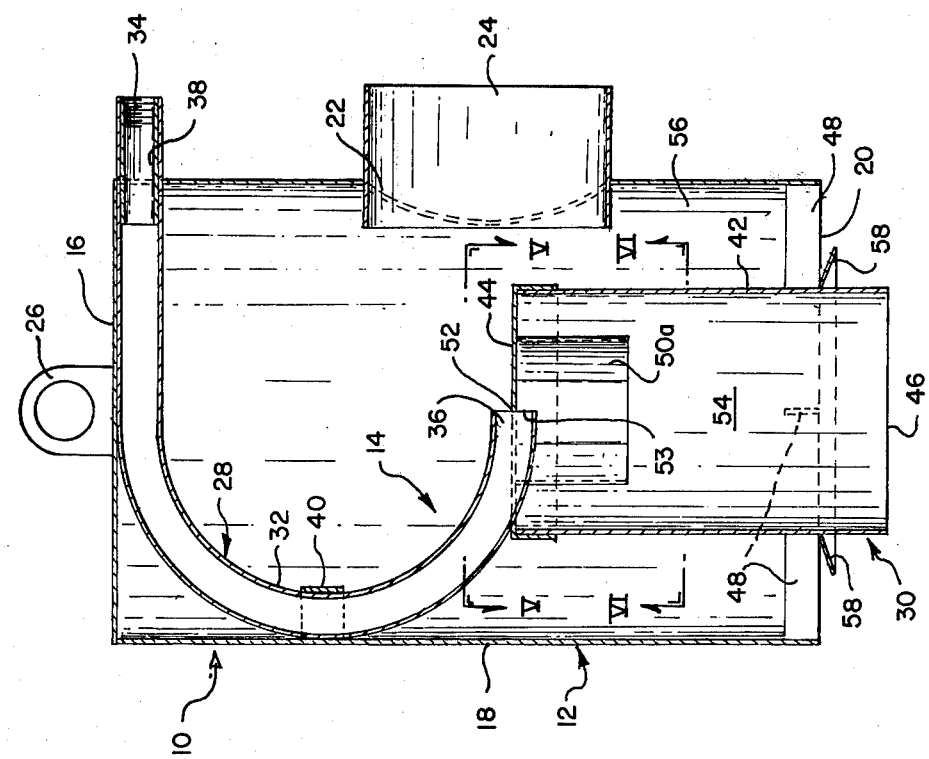
FIG. 3 is a longitudinal, cross sectional view of the snow hood assembly.
Figure 5:
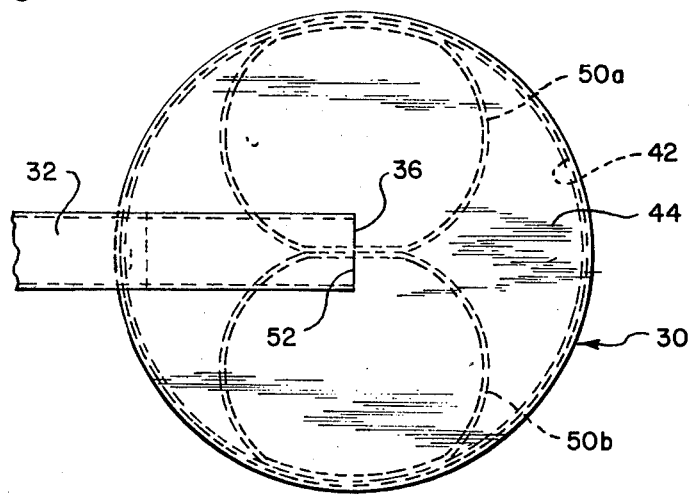
FIG. 5 is a transverse, cross sectional view taken along line V—V of FIG. 4.

As shown in FIG. 3, the J-tube 28 is of conventional construction, including a J-shaped tubular section 32 having an inlet 34 and an outlet 36. The inlet 34 has an orifice plug 38 of the type employed to generate $CO_2$ snow by the flashing of liquid $CO_2$. The inlet 34 is adapted to be selectively coupled with the source of liquid carbon dioxide (not shown) for generating a flow of mixed carbon dioxide snow and vapor through the section 32 from the plug 38. In accordance with principles now well known in the art, the mixed flow from the plug 38 will be separated by flow through the section 32 into a concentrated stream of carbon dioxide snow at the outer radius of the section 32 and a stream of $CO_2$ vapor along the central and inner radius of the section 32.

A bracket 40 supports the J-tube 28 in the hood 12 with the outlet 36 disposed adjacent the upright axis of the hood 12 and facing generally horizontally toward the exhaust port 22. Accordingly, the discharge from the J-tube 28 through the outlet 36 is directed generally horizontally with the snow stream disposed beneath the vapor stream.

Figure 4:
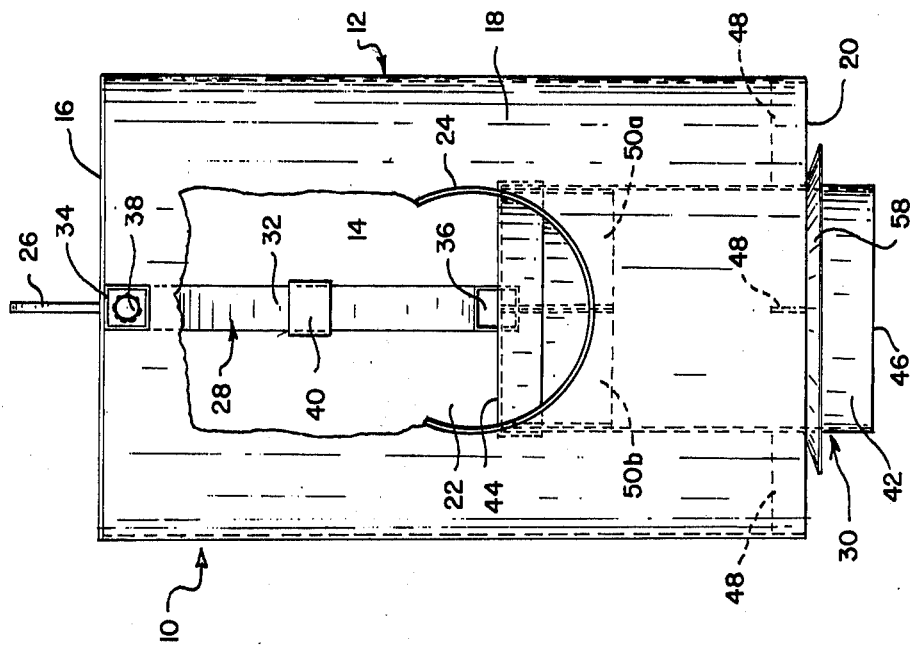
FIG. 4 is a side elevation view of the snow hood assembly with portions shown broken away.

Considering now the diffuser 30 as shown in FIGS. 3 and 4, there is included an elongated, cylindrical shell 42 having a closed top wall 44 and an opposed open bottom 46. The shell 42 is concentrically supported within the hood 12 by multiple struts 48 and extends from the outlet 36 of the section 32 through and beyond the open bottom 20.

As shown specifically in FIG. 3, a portion of the outlet end of the section 32 projects into the shell 42 through an opening or inlet in the top wall 44. The depth of penetration of the J-section 32 through the inlet in the top wall 44 is such that the lowermost portion of the outlet 36, through which the snow stream is projected, is disposed within the shell 42 while the upper portion of the outlet 36 remains outside the shell. The inlet in the top wall 44 presents an edge 52 which transverses the outlet 36 to divide the upper and lower portions thereof. Thus, as the discharge from the outlet 36 flows past the leading edge 52, the vapor stream moves along the top surface of the top wall 44 outside the shell 42, while the snow strem is projected below the top wall into the shell.

Figure 2:
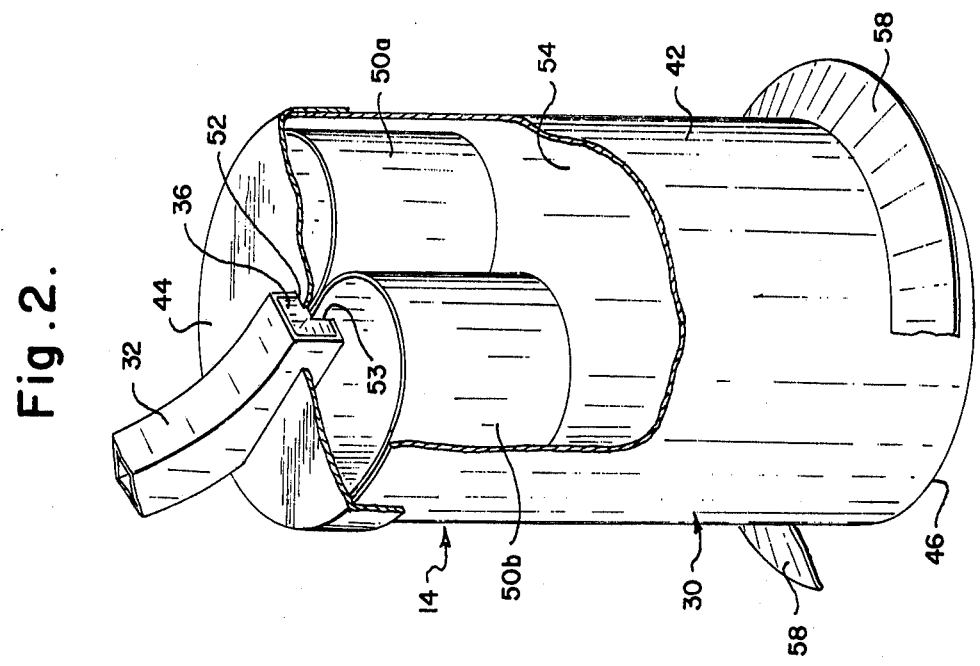
FIG. 2 is an enlarged, perspective view of the diffuser in the snow hood assembly of FIG. 1, with portions shown broken away to reveal further details of construction.

Within the shell 42, a pair of arcuate, upright, tangentially contiguous sleeve-like baffles 50a, 50b depend from the top wall 40 for receiving the $CO_2$ snow stream from the J-tube 28 as will be described. As shown, for example, in FIG. 2, the baffles 50a, 50b have a relief formed in the upper ends thereof to accommodate the portion of the outlet end of the section 32 which projects into the shell 42. The baffles 50a, 50b are disposed with respect to the J-tube 28 such that their line of tangency vertically bisects the snow stream from the lower portion of the outlet 36. The periphery of the relief for the J-tube 28 includes an upstanding edge 53 coextensive with the line of tangency as shown in FIG. 2. Accordingly, as the snow stream from the outlet 36 flows past the edge 53, it is bifurcated into a pair of streamlets, each directed into a respective baffle 50.

Figure 6:
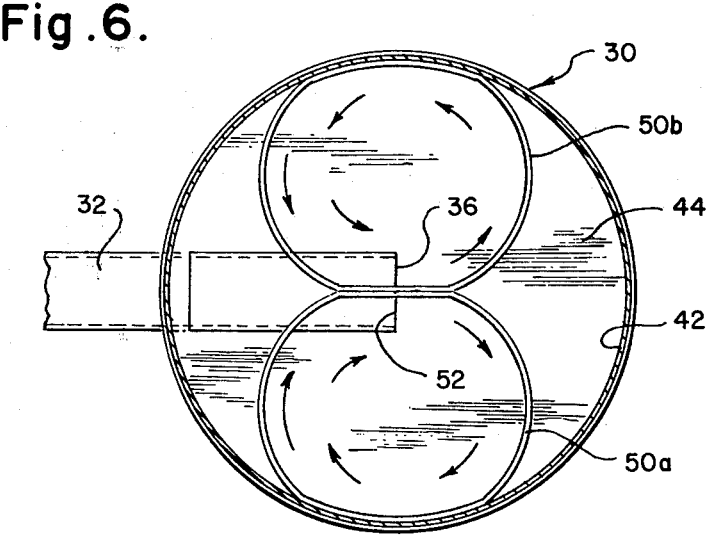
FIG. 6 is transverse, cross sectional view taken along line VI—VI of FIG. 6.

Referring now to FIG. 6, it is seen that the streamlets are caused to follow counterswirling paths (as indicated by the arrows in the drawing) under the influence of the respective baffles 50a, 50b. The baffles 50 serve to destroy the high velocity flow of the carbon dioxide snow in the snow stream from the outlet 36.

A mixing chamber 54 is defined beneath the baffles 50 by the cylindrical shell 42 and is adapted to receive the counterswirling streamlets from the baffles 50 for dissipating the turbulence created therein as the snow progresses through the shell 42 toward the open bottom 46. In the mixing chamber 54, the streamlets interact by virtue of their counterdirection. Collisions between snow particles in the opposed streamlets causes transformation of the fine-particle snow into larger-particle snow. After a brief residence time in the mixing chamber 54, the larger-particle carbon dioxide snow is passed through the open bottom 46 in a well confined, low velocity discharge.

Considering again FIG. 1, there is shown an annular space 56 formed intermediate the side walls of the shell 42 and the hood 12. As previously explained, the vapor discharge from the outlet 36 is projected toward the exhaust port 22 and consequently, passes through the duct 24. This exhaust creates negative pressure within the hood 12 and serves to exhaust by aspiration carbon dioxide vapors which are contained in the discharge from the diffuser 30. In order to reduce the possibility that carbon dioxide snow in the discharge will also be aspirated by the exhaust of the vapor stream from the J-tube 28, a conical deflector 58 is mounted on the outside diameter of the cylindrical shell 42 adjacent the entrance to the annular space 56. Of course, carbon dioxide vapors formed beneath the snow hood assembly 10 may also be aspirated by action of the vapor discharge from the outlet 36.

It is important to note that the $CO_2$ vapor exhaust system is entirely segregated from the diffuser 30. That is to say, the $CO_2$ vapor in the diffuser 30 does not come under the influence of the aspiration created by the exhaust system until the discharge leaves the hood assembly 10. This is believed to contribute to the improved efficiency of the present invention.

INDUSTRIAL APPLICABILITY

As previously explained, the present invention finds particular application in the packaging of perishable materials utilizing carbon dioxide snow as a refrigerant. The snow hood assembly 10 is relatively compact so that it may be moved from location to location if desired in order to provide the packer with greater utility and to eliminate undesired moving of shipping boxes for filling.

The discharge from the snow hood 10 is of relatively low velocity thereby eliminating undesired dispersion of the carbon dioxide snow. Moreover, the discharge is comprised of larger-particle snow so that it can be better confined in use. This is particularly important in applications where a packer "overpacks" his containers such that the container itself provides little confinement for the $CO_2$ snow deposit.

What I claim is:

1. A compact, high efficiency, carbon dioxide snow hood adapted to provide a concentrated, well confined carbon dioxide snow deposit at low discharge velocity, said snow hood including:

means for generating a flow of mixed carbon dioxide vapor and carbon dioxide snow;

means coupled to said flow generating means for separating said flow of carbon dioxide snow and vapor into a first horizontally directed, concentrated stream of carbon dioxide snow and a second horizontally directed stream;

a diffuser coupled with said flow separating means in a manner to receive only said first stream, said diffuser assembly including:

an elongate upright tubular shell having an open bottom;

an inlet in said shell spaced from said bottom and coupled with said flow separating means for admitting said first stream into said shell;

a pair of arcuate, axially upright, tangentially contiguous baffles mounted in said shell and adapted tangentially intercept said first stream adjacent said inlet for dividing the stream into a pair of segregated, counterswirling streamlets of carbon dioxide snow;

said shell extending below the lower ends of said baffles to define a mixing chamber therebeneath for the interaction of said streamlets to form larger-particle $CO_2$ snow which is then passed in a confined, low velocity, discharge at the bottom of said shell; and an open bottomed hood surrounding said diffuser and at least a portion of said flow separating means, said hood having an exhaust port extending through a side wall thereof and adapted to receive said second stream, whereby to exhaust by aspiration carbon dioxide vapor contained in said discharge or formed beneath the hood.

2. The invention of claim 1, each of said baffles each comprising a sleeve of uniform transverse cross section.

3. The invention of claim 2, said sleeves being of equal axial length.

4. The invention of claim 2, said sleeves each having an oblate transverse cross section.

5. The invention of claim 1, said hood and said shell each being cylindrical, said shell being coaxially supported within the hood to define an annular space therebetween for said aspirating exhaust.

6. The invention of claim 5, and an conical outer collar on said shell adjacent the open bottom thereof for precluding entrainment of carbon dioxide snow from said discharge in said aspirating exhaust.

7. The invention of claim 5, a portion of said exhaust port being in direct flow communication with said annular space.

8. The invention of claim 1, said flow separating means comprising a J-tube.

9. The invention of claim 8, said J-tube having a uniform rectangular transverse cross section.

10. A method of forming a confined, low velocity deposit of larger-particle $CO_2$ snow, said method comprising the steps of:

generating a flow of mixed fine-particle $CO_2$ snow and $CO_2$ vapor;

separating said flow into a first concentrated stream of fine-particle $CO_2$ snow and a second stream;

dividing said first stream into a pair of segregated counterswirling streamlets;

introducing said streamlets in juxtaposition into a common mixing chamber whereby to transform the fine-particle $CO_2$ snow into large-particle snow by interaction of the snow particles in the counterswirling streamlets;

discharging said mixed streamlets from said chamber.

11. The method of claim 10, including the further step of exhausting said second stream in a manner to remove $CO_2$ vapor from said discharged mixed streamlets by aspiration.

* * * * *